United States Patent
Kohama

(10) Patent No.: US 7,887,096 B2
(45) Date of Patent: Feb. 15, 2011

(54) PRETENSIONER AND SEAT BELT APPARATUS

(75) Inventor: Shigeru Kohama, Tokyo (JP)

(73) Assignee: Takata Corporation, Tokyo (JP)

( * ) Notice: Subject to any disclaimer, the term of this patent is extended or adjusted under 35 U.S.C. 154(b) by 216 days.

(21) Appl. No.: 12/232,427

(22) Filed: Sep. 17, 2008

(65) Prior Publication Data

US 2009/0096202 A1 Apr. 16, 2009

(30) Foreign Application Priority Data

Oct. 15, 2007 (JP) .............................. 2007-267429

(51) Int. Cl.
  *B60R 22/36* (2006.01)
(52) U.S. Cl. .................. 280/806; 180/268; 280/807; 297/474; 297/480
(58) Field of Classification Search ................ 180/268, 180/274, 281, 286; 188/371, 374; 280/801.1, 280/805, 806, 807; 297/470, 471, 472, 474, 297/479, 480, 481
  See application file for complete search history.

(56) References Cited

U.S. PATENT DOCUMENTS

| | | | | |
|---|---|---|---|---|
| 5,794,978 A | * | 8/1998 | Nishide ...................... | 280/806 |
| 6,068,664 A | * | 5/2000 | Meyer et al. ................ | 297/480 |
| 6,089,605 A | * | 7/2000 | Muller ........................ | 280/806 |
| 6,109,697 A | * | 8/2000 | Lane et al. .................. | 297/480 |
| 6,135,380 A | * | 10/2000 | Brown ......................... | 242/374 |
| 6,237,958 B1 | * | 5/2001 | Patrickson .................. | 280/806 |
| 6,565,121 B2 | * | 5/2003 | Knych et al. ................ | 280/806 |
| 6,669,234 B2 | * | 12/2003 | Kohlndorfer et al. ..... | 280/801.1 |
| 6,866,296 B2 | * | 3/2005 | Webber et al. .............. | 280/806 |
| 7,188,868 B2 | * | 3/2007 | Yamaguchi ................. | 280/806 |
| 7,380,832 B2 | * | 6/2008 | Gray et al. .................. | 280/806 |
| 7,490,857 B2 | * | 2/2009 | Tomita ........................ | 280/806 |
| 2007/0029775 A1 | | 2/2007 | Tomita | |

FOREIGN PATENT DOCUMENTS

JP 2007-45180 2/2007
WO WO 03/018374 A1 3/2003

* cited by examiner

*Primary Examiner*—Faye M. Fleming
*Assistant Examiner*—Laura Freedman
(74) *Attorney, Agent, or Firm*—Foley & Lardner LLP

(57) ABSTRACT

A pretensioner for restraining an occupant with a seat belt by withdrawing a seat belt buckle upon occurrence of an impact on a vehicle. The pretensioner includes a wire. One end portion of the wire is connected to the seat belt buckle and the other end portion of the wire is connected to a piston. The pretensioner further includes a cylinder slidably accommodating the piston and a gas generator supplying gas into the cylinder. The pretensioner further includes a guiding member, having a bent passage portion, that bends the wire toward the direction of the cylinder. On an inner wall surface of the bent passage portion of the guiding member, convex portions are formed in a direction orthogonal to the sliding direction of the wire. The convex portions prevent the wire from being pushed in along the direction of the cylinder.

10 Claims, 4 Drawing Sheets

PRETENSIONER AND SEAT BELT APPARATUS

BACKGROUND

The present application relates to a pretensioner and a seat belt apparatus for restraining an occupant with a seat belt by withdrawing a seat belt buckle on an occasion when the speed of a vehicle is suddenly decreased.

A seat belt apparatus for restraining an occupant has been provided to a vehicle seat, the seat belt apparatus restrains the occupant when the vehicle experiences a sudden change in momentum such as in a sudden stop, a collision, an impact, etc. Such a seat belt apparatus is normally provided with an emergency locking retractor (ELR), which does not restrain an occupant's motion during normal driving, but locks a seat belt retracting shaft only at an occurrence of a vehicle collision to prevent a seat belt from being further delivered. This ELR serves to prevent a seat belt from being further delivered by locking the retracting shaft thereof within an extremely short time when a deceleration exceeding a predetermined value is detected.

However, even though the retracting shaft is locked, the seat belt may be wound loosely on the retracting shaft. Such a device as an ELR may still allow the loosely wound belt to be withdrawn from the retracting shaft as the belt restrains an occupant. It is preferable to reduce, as much as possible, such a delivery of a seat belt due to looseness of the seat belt or a time lag until a retracting shaft is locked.

Hence, a pretensioner may be provided to offset such a delivery of a seat belt due to looseness of the seat belt or a time lag, to some extent, until a retracting shaft is locked. The pretensioner is configured to retract a seat belt buckle if a predetermined deceleration, similar to that in the case of locking operation for the retracting shaft, is detected. One such device is described in Patent Publication No. WO 2003-018374 (FIG. 2 and FIG. 5).

The pretensioner includes a wire, one end portion of which is connected to a seat belt buckle and the other end portion of which is fixed to a piston in a cylinder, and a housing, that holds the cylinder as well as guides the wire toward the direction of the cylinder. The wire is bent at its middle portion. When a vehicle deceleration is detected, a high-pressure gas is jetted into a gas chamber formed in the housing and thereby the piston slides in the cylinder to withdraw the wire.

In the above described pretensioner, however when the pretensioner is not activated, if an excessive load is applied to the seat belt buckle such that a tongue is pushed in to the seat belt buckle with a strong force, or a baggage or an occupant is loaded on the seat belt buckle, the wire is pushed in along the direction of the cylinder.

Accordingly, the pretensioner and a seat belt apparatus disclosed herein below is configured to prevent a wire from being pushed in even when an excessive load is applied to a seat belt buckle.

SUMMARY

One disclosed embodiment relates to a pretensioner for restraining an occupant with a seat belt by withdrawing a seat belt buckle upon occurrence of an impact on a vehicle. The pretensioner includes a wire; a piston; a cylinder slidably accommodating the piston; a gas generator supplying gas into the cylinder; and a guiding member, having a bent passage portion, that bends the wire toward the direction of the cylinder. One end portion of the wire is connected to the seat belt buckle and the other end portion of the wire is connected to the piston. The gas is configured to actuate the piston. On an inner wall surface of the bent passage portion of the guiding member, convex portions are formed in a direction orthogonal to the sliding direction of the wire. The convex portions prevent the wire from being pushed in along the direction of the cylinder.

Another disclosed embodiment relates to a seat belt apparatus. The seat belt apparatus includes a seat belt; a retractor for retracting the seat belt; a tongue provided on the seat belt; a seat belt buckle, to/from which the tongue is attached/detached; and a pretensioner for restraining an occupant with the seat belt by withdrawing the seat belt buckle upon occurrence of an impact on a vehicle. The pretensioner includes a wire; a piston; a cylinder slidably accommodating the piston; a gas generator supplying gas into the cylinder; and a guiding member, having a bent passage portion, that bends the wire toward the direction of the cylinder. One end portion of the wire is connected to the seat belt buckle and the other end portion of the wire is connected to the piston. The gas is configured to actuate the piston. On an inner wall surface of the bent passage portion of the guiding member, convex portions are formed in a direction orthogonal to the sliding direction of the wire. The convex portions prevent the wire from being pushed in along the direction of the cylinder.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
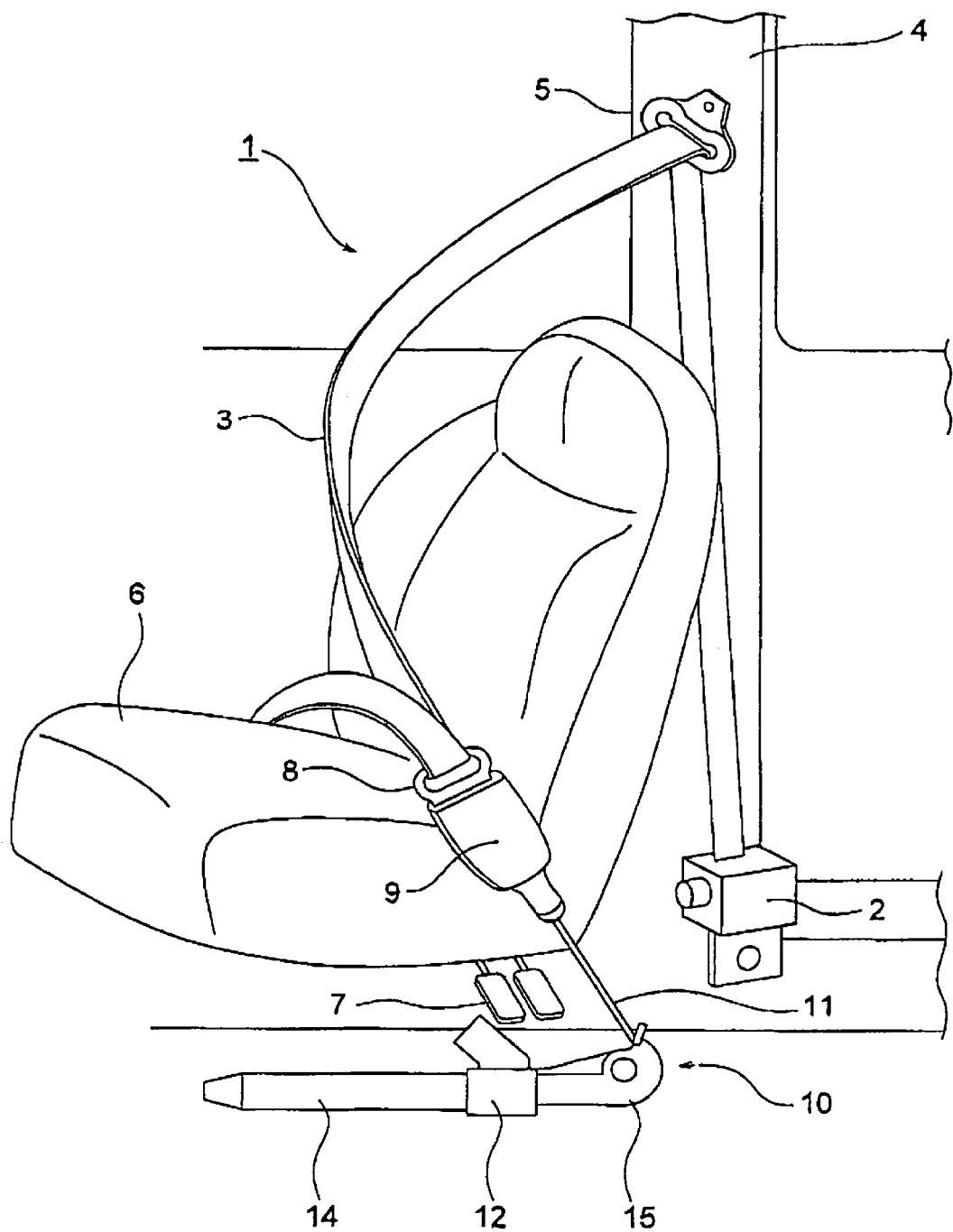
FIG. 1 is a perspective view showing a seat belt apparatus provided with a pretensioner.

According to one exemplary embodiment, a pretensioner is provided for a seat belt apparatus. The pretensioner restrains an occupant with a seat belt by withdrawing a seat belt buckle upon occurrence of an impact on a vehicle. When the pretensioner is not activated, if an excessive load is applied to the seat belt buckle from such a reason that a tongue is pushed in to the seat belt buckle with a strong force, or a baggage or an occupant is loaded on the seat belt buckle, the wire is pushed in along the direction of the cylinder and is sunk therein.

The convex portions are formed on an inner wall surface of the bent passage portion of the guiding member in a direction orthogonal to the sliding direction of the wire. The friction between the wire and the convex portions helps to hold the wire so it is not pushed in along the direction of the cylinder when an excessive load is applied to the seat belt buckle as described above. The convex portions can be easily formed in a direction orthogonal to the sliding direction of the wire by machining, molding, or the like.

Multiple convex portions are formed on an inner wall surface of the bent passage portion in rows along the sliding direction of the wire. Multiple convex portions improves the holding power for the wire. The convex portions are formed on both inner wall surface portions opposed to each other across the bent side of the bent passage portion. The wire is stably held from both sides with the convex portions.

The convex portions are each leaned or inclined in the direction in which the wire is withdrawn to the upstream side. Arranging the convex portions such that they are opposed to the direction in which the wire is withdrawn increases the holding power on the wire.

The guiding member of the pretensioner, including the bent passage portion, is generally formed from die cast aluminum or zinc or another material that is generally softer than the wire. Therefore, when the pretensioner is activated, the bent passage portion can be easily worn due to withdrawing of the wire so the motion of withdrawing the wire 11 is not interfered.

According to another exemplary embodiment, a seat belt apparatus includes a seat belt; a retractor for retracting the seat belt; a tongue provided on the seat belt; a seat belt buckle, to/from which the tongue is attached/detached; and a pretensioner for restraining an occupant with the seat belt by withdrawing the seat belt buckle upon occurrence of an impact on a vehicle. The pretensioner includes a wire; a piston; a cylinder slidably accommodating the piston; a gas generator supplying gas into the cylinder; and a guiding member, having a bent passage portion, that bends the wire toward the direction of the cylinder. One end portion of the wire is connected to the seat belt buckle and the other end portion of the wire is connected to the piston. The gas is configured to actuate the piston. On an inner wall surface of the bent passage portion of the guiding member, convex portions are formed in a direction orthogonal to the sliding direction of the wire. The convex portions prevent the wire from being pushed in along the direction of the cylinder, even when an excessive load is applied to the seat belt buckle.

A preferable embodiment of a pretensioner and a seat belt apparatus according to the present invention will now be described in detail with reference to the attached drawings.

FIG. 1 is a perspective view showing a seat belt apparatus including a pretensioner according to an exemplary embodiment. A seat belt apparatus 1 is provided with a seat belt 3 for restraining an occupant that is unreeled from a retractor 2. The retractor 2 is fixed on a lower portion of a center pillar 4 on the inside of a vehicle cabin. The seat belt 3 extends upward from the retractor 2, passes through a through ring 5 attached on an upper portion of the center pillar 4, and extends back downward. The tip portion of the seat belt 3 is fixed to an anchor plate 7 provided between the center pillar 4 and a seat 6.

A tongue 8 is provided on a portion of the seat belt 3 between the through ring 5 and the anchor plate 7 that is able to slide along the length of the seat belt 3. The tongue 8 is removably coupled to a seat belt buckle 9 provided on the opposite side of the anchor plate 7 across the seat 6.

A pretensioner 10 is held by the seat belt buckle 9. The pretensioner 10 is a device for restraining an occupant with a seat belt 3 by withdrawing the seat belt buckle 9 upon occurrence of a sudden change in momentum (e.g., an impact, a sudden stop, a collision, etc.) of the vehicle.

Figure 2:
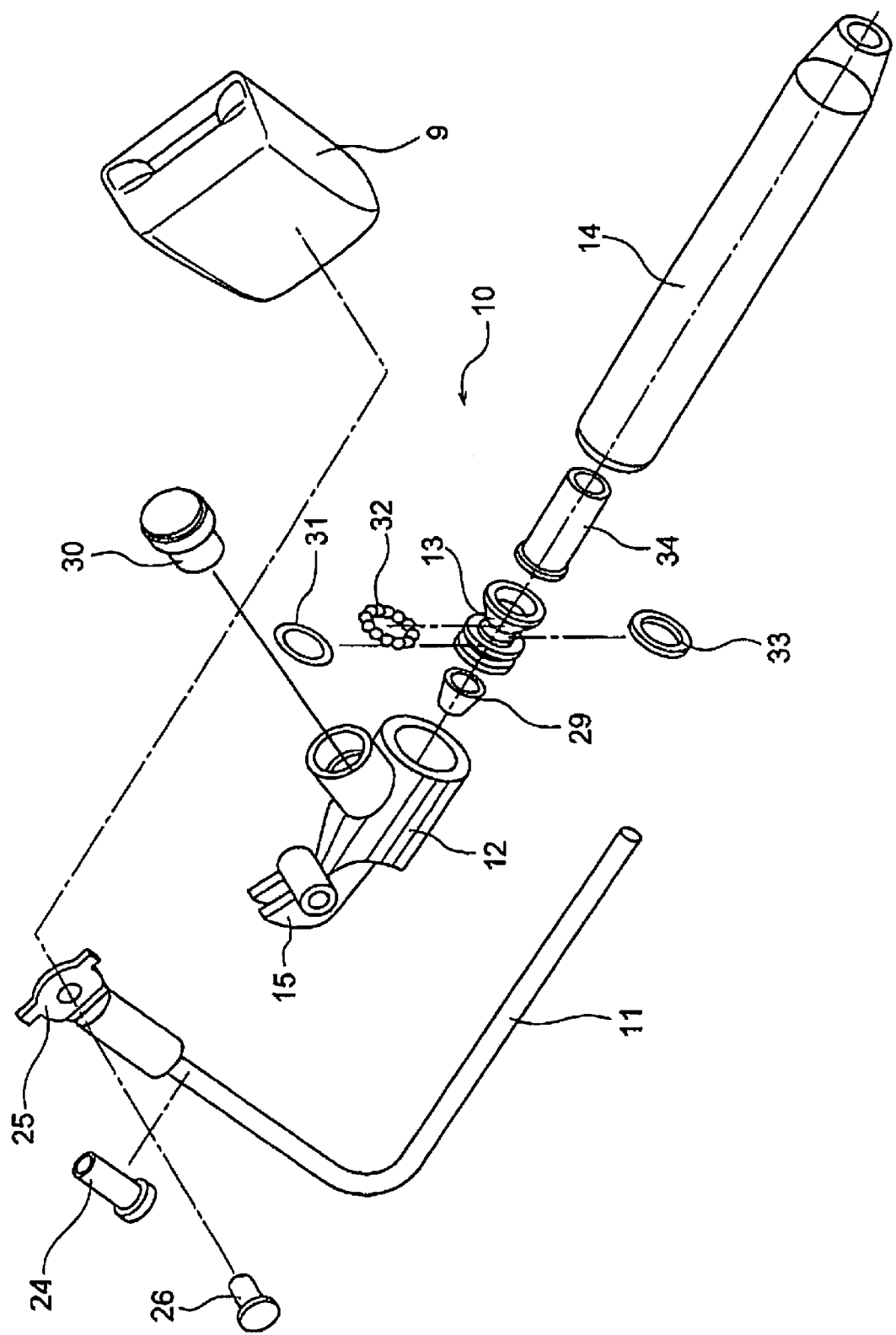
FIG. 2 is an exploded perspective view of the pretensioner provided in the apparatus shown in FIG. 1.

FIG. 2 is an exploded perspective view of the pretensioner according to an exemplary embodiment. The pretensioner 10 is provided with a wire 11, one end portion of which is connected to the seat belt buckle 9 via a holder 24, a bracket 25 and a rivet 26, a piston 13 connected to the other end portion of the wire 11 via a wire end 34, a cylinder 14 that accommodates the piston 13 to be freely slidable via a seal 29, an O-ring 31, balls 32, and a ball ring 33, a housing 12, one end portion (base end portion) of which is attached to the cylinder 14, and a gas generator 30 attached to a middle portion of the housing 12; the housing 12 is provided with a guiding member 15 in one end portion (tip portion) thereof on the opposite side of the cylinder 14. The pretensioner 10 is mounted to a vehicle body (seat) by coupling the housing 12 to base plate (not shown).

Figure 3:
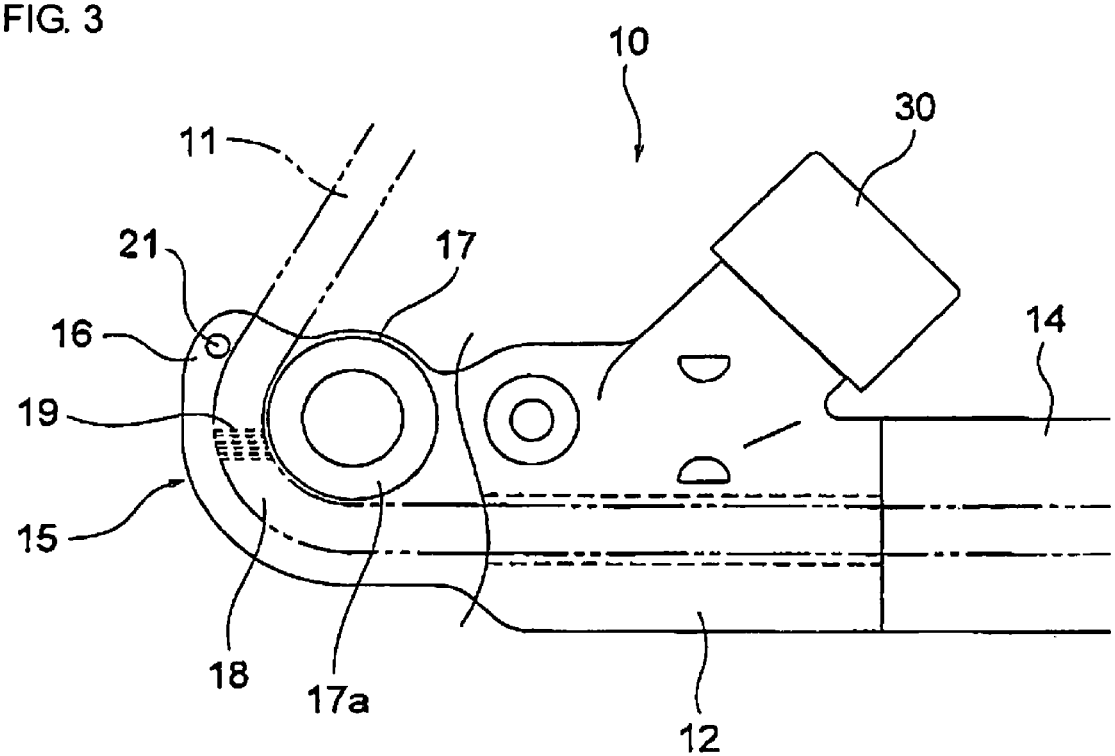
FIG. 3 is a partially cutaway side view of a housing portion of the pretensioner.
Figure 4:
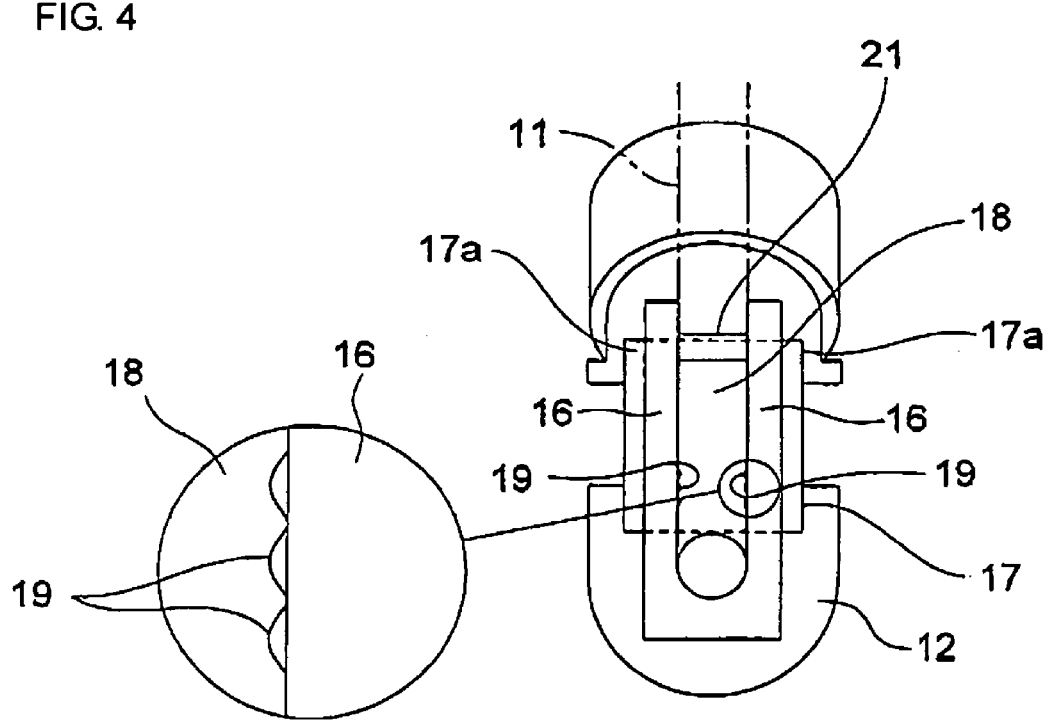
FIG. 4 is an elevational view of the housing portion of the pretensioner.

FIG. 3 is a partially cutaway side view of a housing portion of the pretensioner, and FIG. 4 is an elevational view of the housing portion of the pretensioner. The guiding member 15 includes a pair of opposed vertical frame portions 16 in the tip portion of the housing 12 and a cylindrical member 17 joining respective upper portions of the pair of frame portions 16 to each other. The ends portions 17a of the cylindrical member 17 pass through the frame portions 16 and are used as a mounting portion for a cover (not shown) to be put on the guiding member 15.

One end of the wire 11 is connected to the seat belt buckle 9 and the opposite end of the wire is connected to the piston 13 in the cylinder 14. The middle portion of the wire is bent at a predetermined angle (about 60 degrees in the present example) to be looped over the cylindrical surface of the cylindrical member 17. The pair of frame portions 16 and the cylindrical member 17 define a bent passage portion 18 having an angular U-shaped cross section in which the wire 11 is bent at a predetermined angle and slides to be guided toward the direction of the cylinder 14. The middle portion of the wire 11 in the bent passage portion 18 is prevented from dropping off from the guiding member 15 by a pin 21. The pin 21 is provided at the outside of the wire 11 and is passed through the frame portions 16.

When the pretensioner 10 is not activated, if a large load is applied to the seat belt buckle 9 from such a reason that the tongue 8 is pushed in to the seat belt buckle 9 with a strong force, or a baggage or an occupant is loaded on the seat belt buckle 9, the wire 11 may be pushed in along the direction of the cylinder 14. According to an exemplary embodiment, convex portions 19 (e.g., ridges, bumps, edges, etc.) are provided on an inner wall surface of the bent passage portion 18 in a direction orthogonal to the sliding direction of the wire 11 to create a friction force to hold the wire 11. The friction force created by the convex portions 19 are configured to prevent the wire 11 from being pushed in along the direction of the cylinder 14 even if an excessive load is applied to the seat belt buckle 9.

Figure 5:
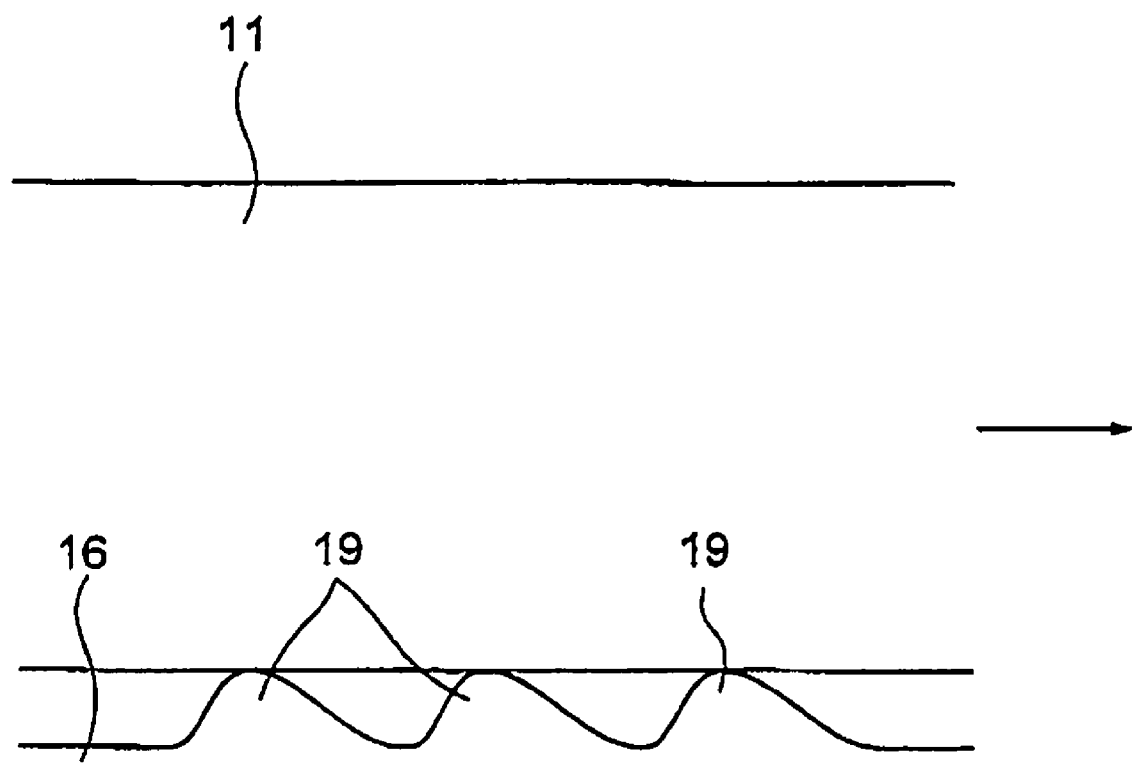
FIG. 5 is an explanatory drawing showing a preferable configuration of convex portions provided on an inner wall surface of a bent passage portion of a guiding member in the tip portion of the housing.

The convex portions 19 are preferably provided on opposing inner wall surfaces of the bent passage portion 18 to contact both sides of the wire. Additionally, it is preferable that the convex portions 19 are provided in plural number of rows along the sliding direction of the wire 11 to create more friction and improve the holding power for the wire 11. The convex portions 19 are each preferably configured to have a smoothly curved cross-sectional outline to prevent the wire 11 from being damaged (e.g., scratched, gouged, etc.) According to one exemplary embodiment, the convex portions 19 may be configured in a posture leaning to the upstream side in the sliding direction of the wire 11 as shown in FIG. 5. The leaning convex portions 19 are opposed to the direction in which the wire 11 is withdrawn, creating a greater frictional force and further stabilizing the holding power for the wire 11.

The housing 12 of the pretensioner 10 is generally formed from die-cast aluminum or die cast zinc. The convex portions 19 may be integrally formed with housing 12 and may therefore also be formed from aluminum or zinc. As the housing 12 is generally formed from a metal (e.g., aluminum, zinc, etc.) that than the wire 1, convex portions 19 are worn down by the wire 11 so the motion of withdrawing the wire 11 is not interfered.

According to the disclosed exemplary embodiment, the friction force generated by the convex portions 19 prevents the wire 11 from being pushed in along the direction of the cylinder 14 when the pretensioner 10 is not activated and a force is applied to the wire (e.g., if an excessive load is applied causing the tongue 8 to be pushed in to the seat belt buckle 9 with a strong force, or a baggage or an occupant is loaded on the seat belt buckle 9).

In the event of a sudden change in momentum of the vehicle (e.g., a sudden stop, a collision, etc.) an ignition signal is sent to an ignition portion of the gas generator 30 and a hot high-pressure gas is jetted from the gas generator 30. The high-pressure gas then passes through a gas flow passage in the housing 12 to be supplied to the cylinder 14. The piston 15 thereby moves to pull the wire 11 to withdraw the seat belt buckle 9. Because the convex portions 19 are worn by being rubbed with the wire 11, the movement of the wire is not interfered and the seat belt buckle 9 is normally withdrawn.

The priority application, Japanese Patent Application No. 2007-267429 filed on Oct. 15, 2007, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A pretensioner for restraining an occupant wearing a seat belt by withdrawing a seat belt buckle upon occurrence of an impact on a vehicle, comprising:
   a wire, wherein one end portion of the wire is connected to the seat belt buckle;
   a piston, connected to the other end portion of the wire, for withdrawing the wire;
   a cylinder slidably accommodating the piston;
   a gas generator supplying gas into the cylinder, the gas configured to actuate the piston;
   a guiding member, having a bent passage portion, that bends the wire toward the direction of the cylinder; and
   a pin, located in the bent passage portion at an outside of the wire, wherein the pin is configured to ensure that an intermediate portion of the wire maintains contact with the guiding member,
   wherein, on an inner wall surface of the bent passage portion of the guiding member, convex portions are formed in a direction orthogonal to the sliding direction of the wire, the convex portions preventing the wire from being pushed in along the direction of the cylinder.

2. The pretensioner as claimed in claim 1, wherein the convex portions are formed on an inner wall surface of the bent passage portion in a plurality of rows along the sliding direction of the wire.

3. The pretensioner as claimed in claim 2, wherein the convex portions are formed on both inner wall surface portions opposed to each other across the bent side of the bent passage portion.

4. The pretensioner as claimed in claim 1, wherein the convex portions are each inclined to the upstream side in the direction in which the wire is withdrawn.

5. The pretensioner as claimed in claim 1, wherein the guiding member is formed through aluminum die casting or zinc die casting.

6. A seat belt apparatus comprising:
   a seat belt;
   a retractor for retracting the seat belt;
   a tongue provided on the seat belt;
   a seat belt buckle, from which the tongue is configured to be attached and detached; and
   a pretensioner for restraining an occupant with the seat belt by withdrawing the seat belt buckle upon occurrence of an impact on a vehicle, the pretensioner including:
   a wire, one end portion of which is connected to the seat belt buckle;
   a piston, connected to the other end portion of the wire, for withdrawing the wire;
   a cylinder accommodating the piston so as to be slidable;
   a gas generator supplying gas into the cylinder, the gas configured to actuate the piston;
   a guiding member having a bent passage portion, that bends the wire toward the direction of the cylinder; and
   a pin, located in the bent passage portion at an outside of the wire, wherein the pin is configured to ensure that an intermediate portion of the wire maintains contact with the guiding member,
   wherein, on an inner wall surface of the bent passage portion of the guiding member, convex portions preventing the wire from being pushed in along the direction of the cylinder are formed.

7. The apparatus of claim 6, wherein the convex portions are formed on an inner wall surface of the bent passage portion in a plurality of rows along the sliding direction of the wire.

8. The apparatus of claim 7, wherein the convex portions are formed on both inner wall surface portions opposed to each other across the bent side of the bent passage portion.

9. The apparatus of claim 6, wherein the convex portions are each inclined to the upstream side in the direction in which the wire is withdrawn.

10. A seat belt pretensioner comprising:
   a piston slidably positioned in a cylinder;
   a wire connected at one to the piston and at the other end to a seat belt buckle;
   a gas generator configured to supply gas into the interior of the cylinder; wherein the gas supplied by the gas generator is configured to actuate movement of the piston;
   a bent guiding member for guiding the wire between the buckle and the cylinder, wherein the wire passes through the guiding member and an inner wall surface of the guiding member includes convex portions protruding toward the wire to thereby prevent movement of the wire toward the cylinder; and
   a pin, located in a bent passage portion of the bent guiding member at an outside of the wire, wherein the pin is configured to ensure that an intermediate portion of the wire maintains contact with the bent guiding member.

* * * * *